United States Patent
Yamashita et al.

(10) Patent No.: US 12,319,811 B2
(45) Date of Patent: Jun. 3, 2025

(54) METHOD OF PRODUCING RESIN AND METHOD OF PRODUCING INSULATING STRUCTURE

(71) Applicant: TOSHIBA MITSUBISHI-ELECTRIC INDUSTRIAL SYSTEMS CORPORATION, Tokyo (JP)

(72) Inventors: Yu Yamashita, Tokyo (JP); Tetsuo Yoshimitsu, Tokyo (JP); Kotaro Mura, Tokyo (JP); Takahiro Imai, Kawasaki (JP)

(73) Assignee: TMEIC CORPORATION, Tokyo (JP)

( * ) Notice: Subject to any disclaimer, the term of this patent is extended or adjusted under 35 U.S.C. 154(b) by 310 days.

(21) Appl. No.: 18/043,053

(22) PCT Filed: Apr. 16, 2021

(86) PCT No.: PCT/JP2021/015726
§ 371 (c)(1),
(2) Date: Feb. 27, 2023

(87) PCT Pub. No.: WO2022/044420
PCT Pub. Date: Mar. 3, 2022

(65) Prior Publication Data
US 2023/0399504 A1     Dec. 14, 2023

(30) Foreign Application Priority Data
Aug. 28, 2020   (JP) .................................. 2020-145094

(51) Int. Cl.
C08L 63/00   (2006.01)
C08G 59/42   (2006.01)
(Continued)

(52) U.S. Cl.
CPC .............. *C08L 63/00* (2013.01); *C08G 59/42* (2013.01); *C08J 5/249* (2021.05); *C08K 3/22* (2013.01);
(Continued)

(58) Field of Classification Search
CPC .......... C08L 63/00; C08J 5/249; C08G 59/42; C08K 3/22; C08K 5/06
See application file for complete search history.

(56) References Cited

U.S. PATENT DOCUMENTS

2010/0160503 A1 *   6/2010   Nakagawa ............... C08J 5/005
                                                                  977/773
2011/0200825 A1 *   8/2011   Chakraborty .......... B05D 3/062
                                                                  428/524
(Continued)

FOREIGN PATENT DOCUMENTS

CA       2774877 C   *  2/2015   ............. B29B 15/10
EP       2543693 A1  *  1/2013   ................ C08J 5/24
(Continued)

OTHER PUBLICATIONS

Hameed, Nishar, et al., "Individual dispersion of carbon nanotubes in epoxy via a novel dispersion—curing approach using ionic liquids". Phys. Chem. Chem. Phys., 2013, 15, 11696-11703.*
(Continued)

*Primary Examiner* — Bret P Chen
(74) *Attorney, Agent, or Firm* — XSENSUS

(57) ABSTRACT

A resin producing method is a method of producing a resin with which an insulating structure formed on an outer peripheral portion of a conductor is impregnated. The resin producing method includes a dispersion liquid mixing step of mixing an epoxy resin and a dispersion liquid in which a nanofiller is dispersed in a reactive diluent that reduces a viscosity of the epoxy resin by reacting with the epoxy resin, (Continued)

and a curing agent mixing step of mixing a composition produced by the dispersion liquid mixing step, with a curing agent that cures the epoxy resin. The epoxy resin includes, for example, an alicyclic epoxy resin.

17 Claims, 15 Drawing Sheets

(51) Int. Cl.
      *C08J 5/24*    (2006.01)
      *C08K 3/22*    (2006.01)
      *C08K 5/06*    (2006.01)
      *H01B 3/40*    (2006.01)
      *B82Y 30/00*   (2011.01)

(52) U.S. Cl.
      CPC ............ *C08K 5/06* (2013.01); *H01B 3/40* (2013.01); *B82Y 30/00* (2013.01); *C08J 2363/00* (2013.01); *C08K 2201/003* (2013.01); *C08K 2201/011* (2013.01); *C08L 2201/56* (2013.01); *C08L 2203/202* (2013.01)

(56) References Cited

U.S. PATENT DOCUMENTS

| | | | |
|---|---|---|---|
| 2013/0131218 A1 | 5/2013 | Gröppel et al. | |
| 2015/0133598 A1* | 5/2015 | Ono | D06M 15/59 427/389.9 |
| 2018/0051167 A1 | 2/2018 | Endo et al. | |
| 2019/0143369 A1* | 5/2019 | Lin | C25D 5/56 427/532 |
| 2019/0284395 A1* | 9/2019 | Kasahara | C08L 79/08 |
| 2019/0292671 A1* | 9/2019 | Zhamu | B82B 3/0066 |
| 2019/0338146 A1* | 11/2019 | Meng | C08G 18/348 |
| 2019/0345345 A1* | 11/2019 | Meng | C09D 149/00 |
| 2020/0131336 A1* | 4/2020 | Anderson | C07C 255/54 |
| 2020/0223797 A1* | 7/2020 | Galimberti | C07D 207/333 |

FOREIGN PATENT DOCUMENTS

| | | | | |
|---|---|---|---|---|
| JP | 2003-96266 A | 4/2003 | | |
| JP | 2019-131629 A | 8/2019 | | |
| WO | WO2009002671 A1 * | 12/2008 | | C08J 3/03 |
| WO | 2016/152839 A1 | 9/2016 | | |

OTHER PUBLICATIONS

Chen, Heng, et al., "Preparation of carbon nanotube/epoxy composite films with high tensile strength and electrical conductivity by impregnation under pressure". Front. Mater. Sci. 2019, 13(2): 165-173.*

International Search Report and Written Opinion mailed on May 25, 2021, received for PCT Application PCT/JP2021/015726, filed on Apr. 16, 2021, 8 pages including English Translation.

Notification of Reason for Refusal mailed on May 17, 2022, received for JP Application 2021-538674, 6 pages including English Translation.

Office Action issued Aug. 3, 2023 in Indian Patent Application No. 202347011747 (English translation included), 5 pages.

* cited by examiner

LONGITUDINAL DIRECTION

METHOD OF PRODUCING RESIN AND METHOD OF PRODUCING INSULATING STRUCTURE

CROSS-REFERENCE TO RELATED APPLICATIONS

The present application is based on PCT filing PCT/JP2021/015726, filed Apr. 16, 2021, which claims priority to JP 2020-145094, filed Aug. 28, 2020, the entire contents of each are incorporated herein by reference.

TECHNICAL FIELD

The present invention relates to a method of producing a resin and a method of producing an insulating structure.

BACKGROUND ART

A coil used in a rotary electric machine such as an electric motor or a generator is provided with an insulating structure that prevents a current flowing through a conductor in the coil from leaking to the outside.

As the insulating structure as described above, a structure is known in which an insulating tape including mica or the like is wound around an outer peripheral portion of a conductor, and a space in the insulating tape is impregnated with a resin including a filler made of a metal oxide or the like. The filler functions to suppress the development of an electric tree generated in the insulating tape and improve the insulating performance.

CITATION LIST

Patent Literature

Patent Literature 1: US 2013/0131218 A

SUMMARY OF INVENTION

Problems to be Solved by the Invention

The effect of suppressing the development of the electric tree by the filler as described above largely depends on the dispersiveness of the filler. When the dispersiveness of the filler is low, the filler agglomerates in the insulating structure, and the region where the electric tree easily develops (region of only resin) increases, so that the effect of suppressing the development of the electric tree is reduced.

The viscosity of the filler-including resin greatly affects the productivity of the insulating structure. For example, when the viscosity of the resin unintentionally increases, an operation of impregnating the insulating tape or the like with the resin is difficult.

As described above, in order to efficiently produce a high-performance insulating structure, it is important to produce a resin having high dispersiveness and high viscosity stability of the filler.

Therefore, an object of the present invention is to provide a method of producing a resin and a method of producing an insulating structure capable of efficiently producing a high-performance insulating structure.

Means for Solving Problem

An aspect of the present invention is a method of producing a resin with which an insulating structure formed on an outer peripheral portion of a conductor is impregnated, the method including: a dispersion liquid mixing step of mixing an epoxy resin with a dispersion liquid in which a nanofiller is dispersed in a reactive diluent that reduces a viscosity of the epoxy resin by reacting with the epoxy resin; and a curing agent mixing step of mixing a composition produced by the dispersion liquid mixing step, with a curing agent that cures the epoxy resin.

DESCRIPTION OF EMBODIMENTS

Hereinafter, an embodiment of the present invention will be described with reference to the drawings. In the present specification, components according to the embodiment and descriptions of the components may be described in a plurality of expressions. The components and the description thereof are examples, and are not limited by the expression of the present specification. Components may also be identified with names different from those herein. In addition, the component may be described by an expression different from the expression in the present specification.

<Configuration of Rotary Electric Machine>

Figure 1:
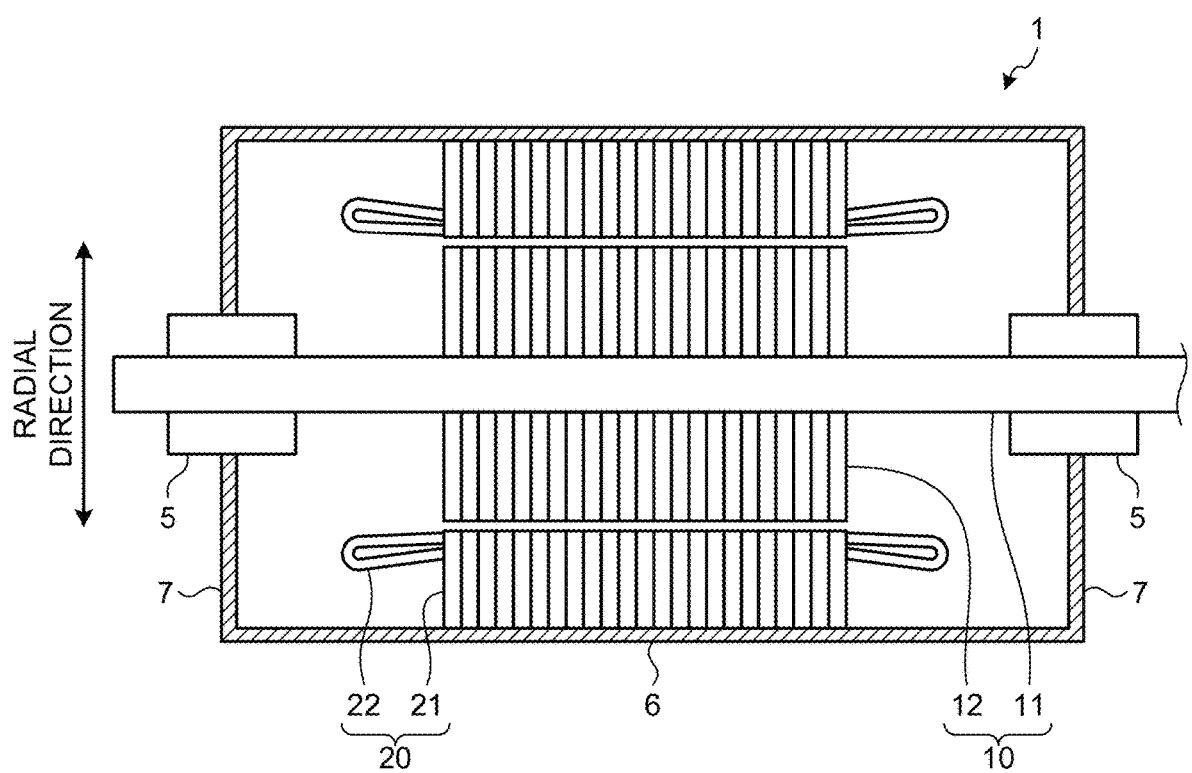
FIG. 1 is a cross-sectional view illustrating a configuration of a rotary electric machine according to the embodiment.

FIG. 1 is a cross-sectional view illustrating a configuration of a rotary electric machine 1 according to the embodiment.

The rotary electric machine 1 includes a rotor 10 and a stator 20. The rotary electric machine 1 is a component such as an electric motor or a generator.

The rotor 10 includes a rotor shaft 11 and a rotor core 12. Near both ends of the rotor shaft 11 are rotatably and axially supported by bearings 5. The bearing 5 is fixed to a bearing bracket 7 provided integrally with a frame 6 constituting the outer frame of the rotary electric machine 1. The rotor core 12 is fixed to the outer peripheral face of the rotor shaft 11 and rotates together with the rotor shaft 11.

The stator 20 includes a stator core 21 and an insulating coil 22. The stator core 21 is disposed radially outward of the rotor core 12 with a gap. The insulating coil 22 is a member that is incorporated in the stator core 21 and generates a magnetic field necessary for the rotary electric machine 1, and an insulating structure described later is provided on an outer peripheral portion thereof. The insulating coil 22 is assembled so as to penetrate the stator core 21.

<Configuration of Insulating Coil>

Figure 2:
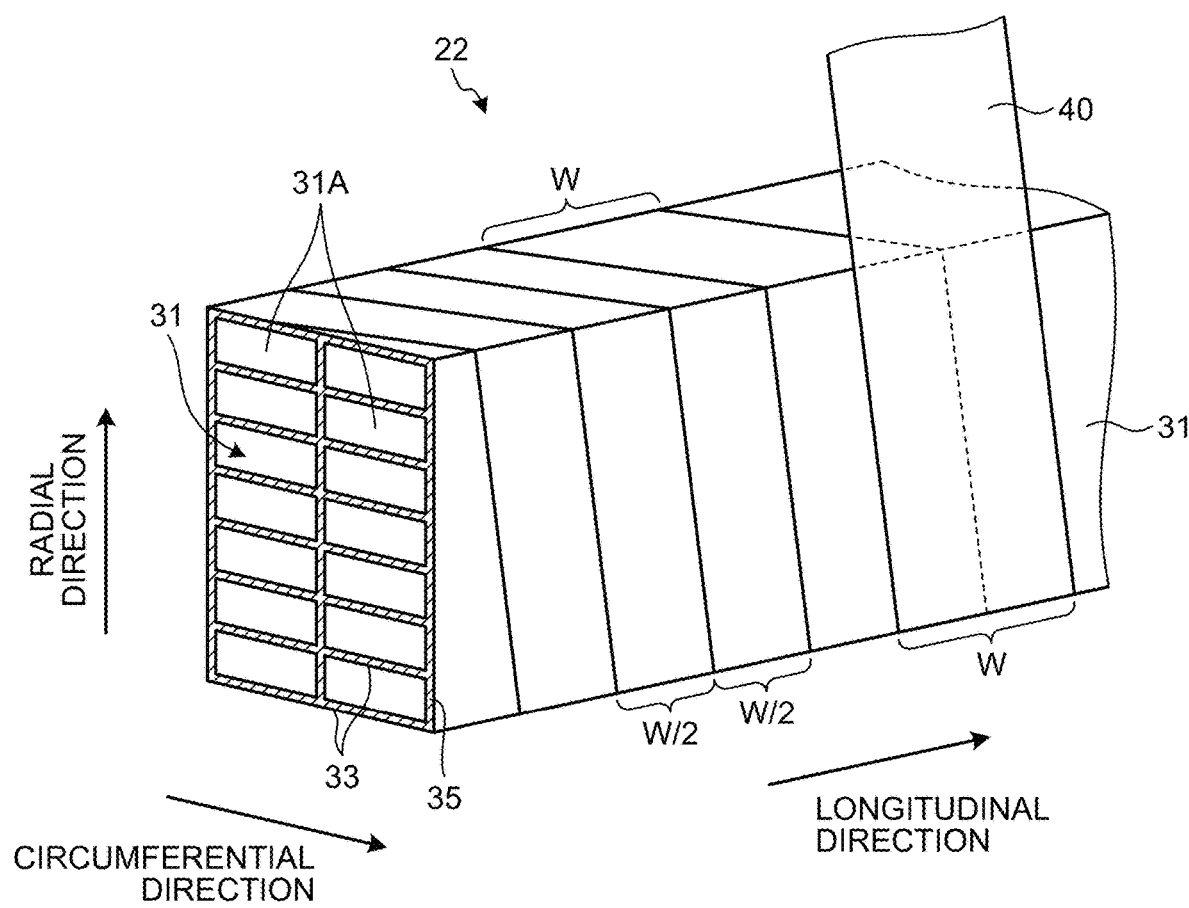
FIG. 2 is a perspective view illustrating a configuration of an insulating coil according to the embodiment.
Figure 3:
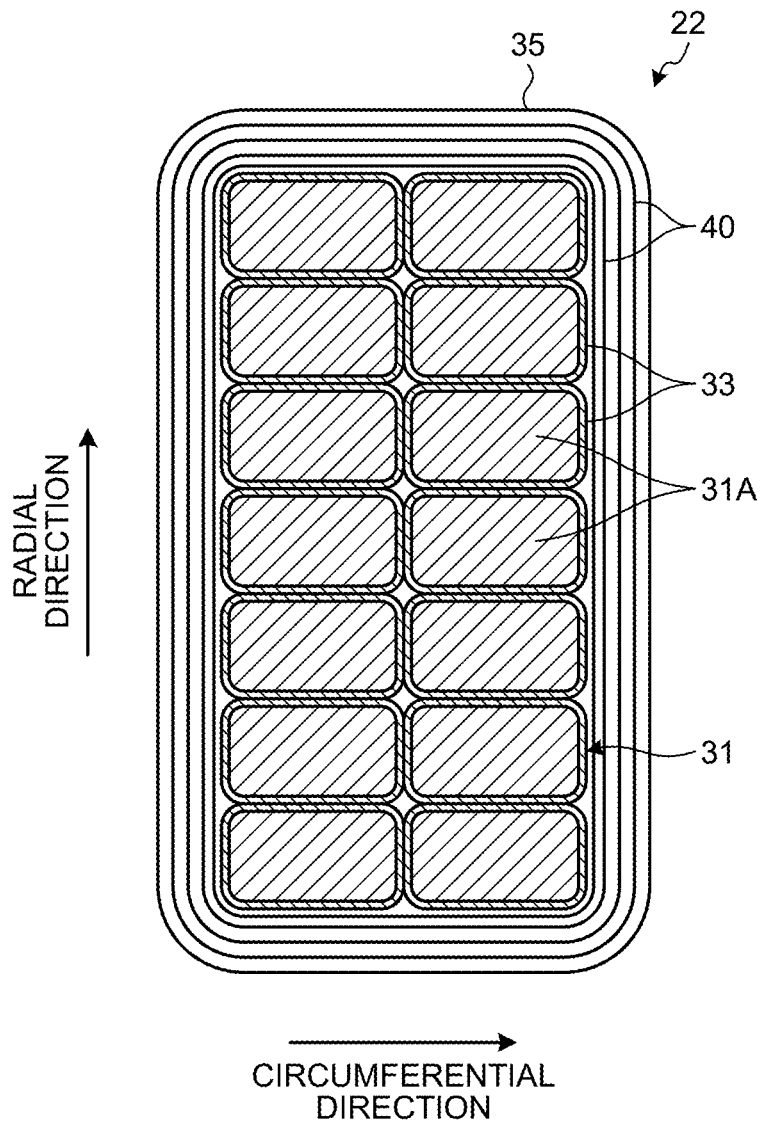
FIG. 3 is a cross-sectional view illustrating a configuration of an insulating coil according to the embodiment.

FIG. 2 is a perspective view illustrating a configuration of the insulating coil 22 according to the embodiment. FIG. 3 is a cross-sectional view illustrating a configuration of the insulating coil 22 according to the embodiment.

The insulating coil 22 includes a laminated conductor 31 (conductor), a turn insulating portion 33, and a main insulating portion 35. The turn insulating portion 33 and the main insulating portion 35 constitute an insulating structure of the insulating coil 22.

The laminated conductor 31 is formed by laminating a plurality of conducting wires 31A. The laminated conductor 31 according to the present embodiment is configured by bundling 14 (the number of lamination: 7, the number of columns: 2) conducting wires 31A. Note that the configuration of the laminated conductor 31 is not limited thereto, and should be appropriately designed according to the use situation. The laminated conductor 31 may include, for example, more than 14 conducting wires 31A, or may be configured by laminating only one conducting wire 31A.

The turn insulating portion 33 is provided on an outer face of each conducting wire 31A. As a result, the outer face of the laminated conductor 31 is covered with the turn insulating portion 33. The main insulating portion 35 is provided outside the turn insulating portion 33. The main insulating portion 35 is configured by winding a main insulating tape 40 (tape-shaped member).

The main insulating tape 40 according to the present embodiment is spirally wound by a half lap method. When the width of the main insulating tape 40 is W, the pitch of the spiral is W/2. That is, the main insulating tape 40 is wound so as to overlap a half of the main insulating tape 40 wound in the previous turn. After one round of winding of the laminated conductor 31 in the entire longitudinal direction is completed, the main insulating tape 40 may be wound so as to be further superimposed thereon. As a result, the main insulating tape 40 can be formed in a multilayer shape. As the number of layers of the main insulating tape 40 increases, the insulating performance can be improved. The number of windings of the main insulating tape 40 may be appropriately selected according to required insulating performance and the like.

Figure 4:
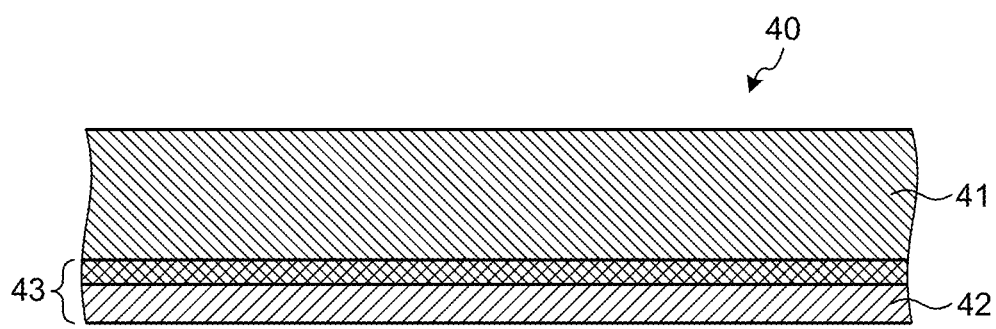
FIG. 4 is a cross-sectional view schematically illustrating a configuration of a main insulating tape according to the embodiment.

FIG. 4 is a cross-sectional view schematically illustrating a configuration of the main insulating tape 40 according to the embodiment.

Main insulating tape 40 includes a main insulating layer 41, a fiber reinforced layer 42, and a polymer layer 43.

The main insulating layer 41 is made of a non-conductive material, and is a main portion for realizing an insulating function of the main insulating tape 40. The fiber reinforced layer 42 is a portion that supports the main insulating layer 41 and has a function of securing strength of the main insulating tape 40 as a whole. The polymer layer 43 is a portion that includes a bonding polymer, penetrates the fiber reinforced layer 42, and has a function of bonding the fiber reinforced layer 42 and the main insulating layer 41.

The main insulating layer 41 includes, for example, an inorganic material such as mica, asbestos, or a ceramic powder as a main component. The fiber reinforced layer 42 includes, for example, glass fiber, polyester fiber, or the like as a main component, and is usually woven in a mesh shape. In addition, the fiber reinforced layer 42 is not limited to fibers, and may be formed as a nonwoven fabric or may be formed of a polymer film such as polyester or polyimide. The polymer layer 43 includes, for example, an unsaturated polyester resin, an epoxy resin, or the like as a main component.

The thickness of the main insulating layer 41 is, for example, about 100 µm. The thickness of the fiber reinforced layer 42 is thinner than that of the main insulating layer 41, and is, for example, about 30 µm or less in many cases. In FIG. 4, the polymer layer 43 is illustrated as a constituent element of the main insulating tape 40, but since the polymer layer 43 penetrates the fiber reinforced layer 42, the polymer layer 43 has almost no thickness. Therefore, the main insulating layer 41 and the fiber reinforced layer 42 are usually almost in contact with each other. Usually, the main insulating tape 40 is wound with the main insulating layer 41 facing the laminated conductor 31 to be insulated and the fiber reinforced layer 42 facing outward, but in some cases, the other way around.

<Internal Structure of Main Insulating Portion>

Figure 5:
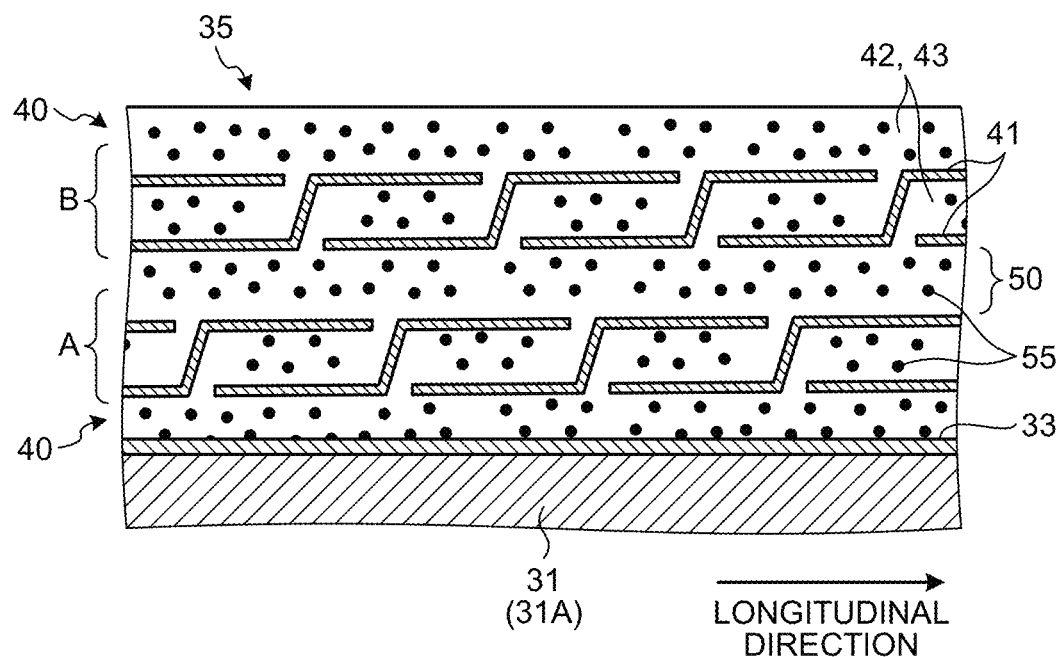
FIG. 5 is a cross-sectional view schematically illustrating an internal structure of a main insulating portion according to the embodiment.

FIG. 5 is a cross-sectional view schematically illustrating an internal structure of the main insulating portion 35 according to the embodiment.

FIG. 5 illustrates a cross section along the longitudinal direction of the laminated conductor 31 (conducting wires 31A). FIG. 5 illustrates a case where main insulating tape 40 is wound twice, and the main insulating portion 35 includes a taping layer A formed by a first time winding and a taping layer B formed by a second time winding.

The main insulating portion 35 includes the main insulating layer 41 and an impregnated portion 50. In each of the taping layer A and the taping layer B, the main insulating layers 41 adjacent to each other in the longitudinal direction overlap each other by a half of the width. This is due to the winding method of the half lap method.

The impregnated portion 50 is a portion formed by permeation of a resin including a nanofiller 55 into or around the polymer layer 43 that joins the main insulating layer 41 and the fiber reinforced layer 42. In FIG. 5, in order to emphasize the fiber reinforced layer 42 or the polymer layer 43 formed by penetrating around the fiber reinforced layer, the thickness of the main insulating layer 41 is expressed to be thin, and the line indicating the fiber reinforced layer 42 is omitted. As illustrated in FIG. 5, the periphery of the main insulating layer 41 is covered with the impregnated portion 50 (polymer layer 43) in which the nanofiller 55 is dispersed. Further, the resin including the nanofiller 55 also penetrates the main insulating layer 41, but the expression thereof is omitted in FIG. 5.

The nanofiller 55 includes non-conductive nano-order particles, for example, particles including a metal oxide. The particle size of the nanofiller 55 is preferably 50 nm or less. Specific examples of the substance constituting the nanofiller 55 will be described later.

Figure 6:
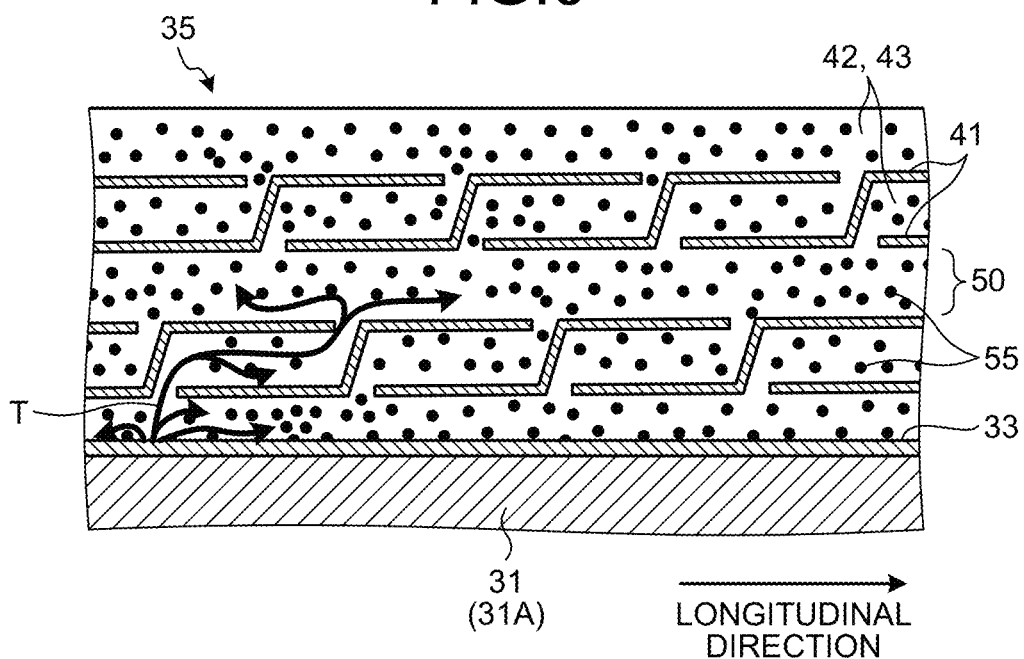
FIG. 6 is a cross-sectional view schematically illustrating an effect of a nanofiller according to the embodiment.

FIG. 6 is a cross-sectional view schematically illustrating the effect of the nanofiller 55 according to the embodiment.

FIG. 6 illustrates a state in which the electric tree T is generated in the impregnated portion 50. The electric tree T is an electrical deterioration phenomenon caused by a voltage applied to the laminated conductor 31 and the stator 20. When the electric tree T develops and reaches the surface layer portion of the main insulating portion 35, dielectric breakdown occurs, and the rotary electric machine 1 stops its operation.

The nanofiller 55 dispersed in the impregnated portion 50 has a development suppressing effect of suppressing the linear development of the electric tree T and reducing the development speed of the electric tree T. Thus, the insulating performance of the main insulating portion 35 can be improved. Such a development suppressing effect changes not only depending on the content of the nanofiller 55 but also strongly depending on dispersiveness. The development suppressing effect increases as dispersiveness (uniformity of dispersion) of the nanofiller 55 in the impregnated portion 50 increases. Therefore, in order to improve the development suppressing effect (insulating performance), it is important to use a resin having high dispersiveness of the nanofiller 55.

<Method of Producing Insulating Structure>

Figure 7:
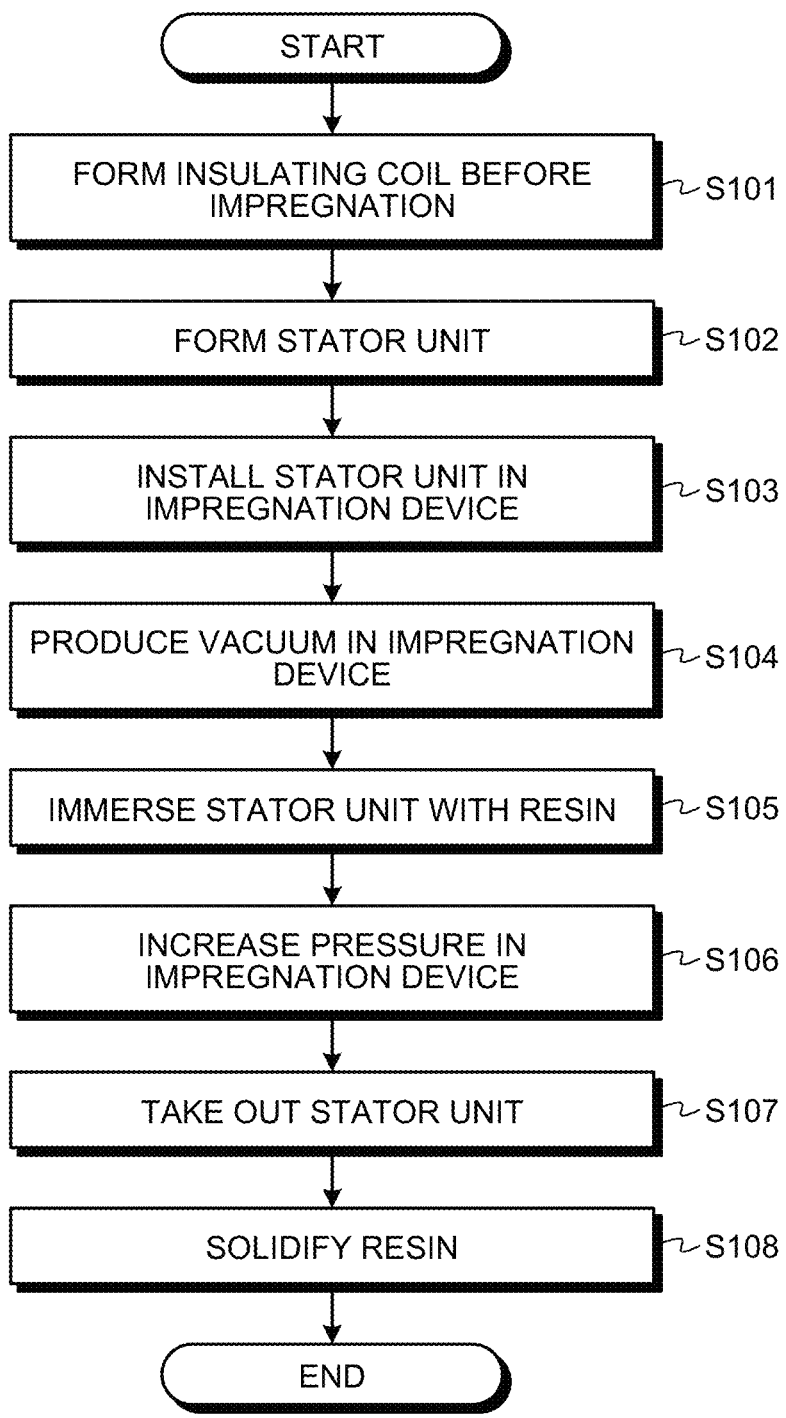
FIG. 7 is a flowchart illustrating a procedure in the method of producing the insulating structure of the insulating coil according to the embodiment.
Figure 8:
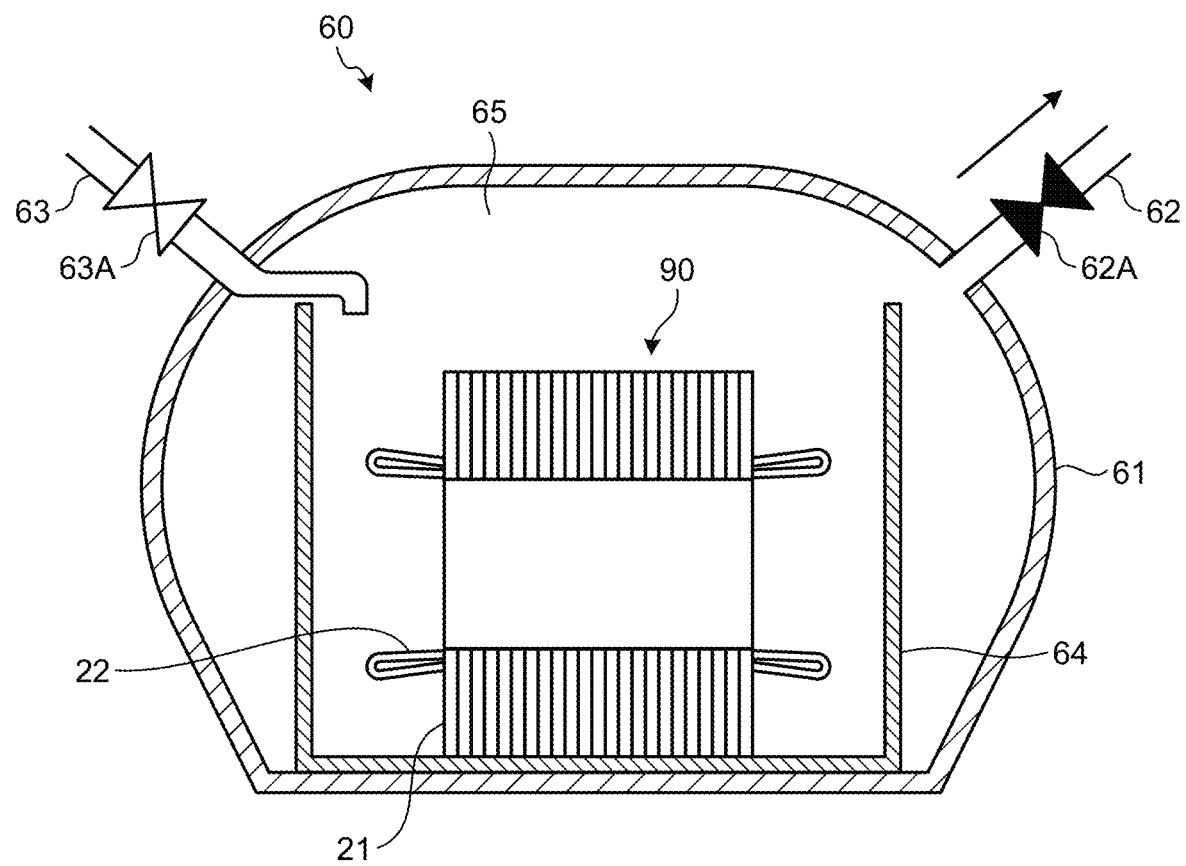
FIG. 8 is a diagram illustrating a state in the first half stage of the impregnation device used in the method of producing the insulating structure according to the embodiment.
Figure 9:
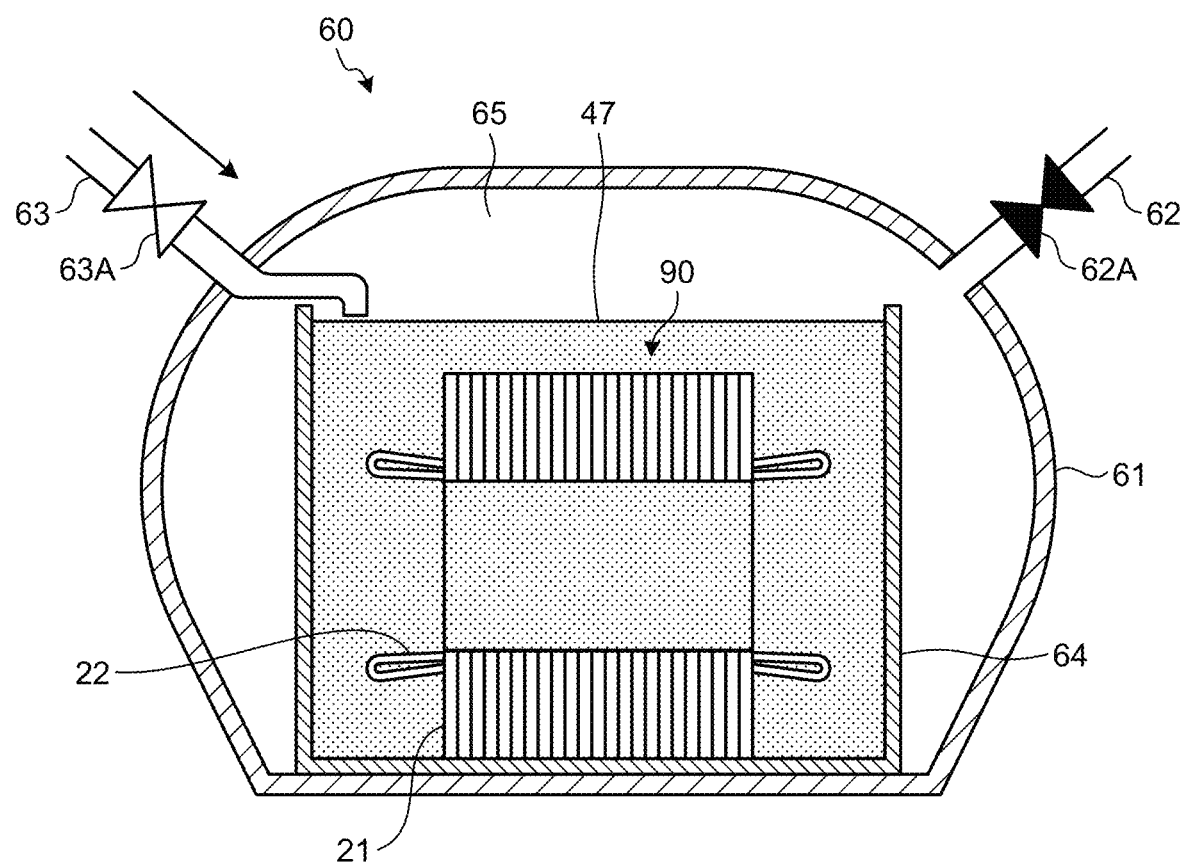
FIG. 9 is a diagram illustrating a state in the second half stage of the impregnation device used in the method of producing the insulating structure according to the embodiment.

FIG. 7 is a flowchart illustrating a procedure in the method of producing the insulating structure of the insulating coil 22 according to the embodiment. FIG. 8 is a diagram illustrating a state in the first half stage of an impregnation device 60 used in the method of producing the insulating structure according to the embodiment. FIG. 9 is a diagram illustrating a state in the second half stage of the impregnation device 60 used in the method of producing the insulating structure according to the embodiment.

First, the main insulating tape 40 is wound around the laminated conductor 31 (see FIG. 2), and the insulating coil 22 before resin impregnation is formed (S101). Thereafter, the insulating coil 22 before resin impregnation is inserted into the stator core 21 and assembled to form a stator unit 90 (see FIG. 8) (S102). Thereafter, the stator unit 90 is installed in the impregnation device 60 (S103), and the inside of the impregnation device 60 is evacuated (S104).

As illustrated in FIG. 8, the impregnation device 60 includes a container 61, an exhaust pipe 62, an exhaust valve 62A, a supply pipe 63, a supply valve 63A, and a treatment tank 64. In step S103, the stator unit 90 is installed in the treatment tank 64 placed in the container 61. Thereafter, in step S104, vacuum is produced in the container 61. When evacuation is performed, the supply valve 63A is closed, and air in the container 61 is sucked by a suction device connected to the exhaust pipe 62. As a result, the inside of the insulating coil 22 is in a vacuum state even in the space in the turn insulating portion 33 and the main insulating tape 40 wound around the turn insulating portion.

After the producing the vacuum is performed as described above, as illustrated in FIG. 9, the stator unit 90 in the treatment tank 64 is immersed in a resin 47 (S105). At this time, the exhaust valve 62A is closed, and the resin 47 is supplied from the supply pipe 63 into the treatment tank 64. The resin 47 is supplied so that the entire stator unit 90 is immersed.

After the stator unit 90 is immersed in the resin 47 as described above, the pressure in the impregnation device 60 (container 61) is increased (S106). As illustrated in FIG. 9, the increasing the pressure is performed by opening the supply valve 63A and supplying a pressurized gas 65 from the supply pipe 63 into the container 61. The pressurized gas 65 is preferably a substance that does not react with the resin 47, and is preferably an inert gas such as nitrogen gas or dry air. Increasing the pressure in the container 61 causes the resin 47 including the nanofiller 55 to be impregnated into the turn insulating portion 33 and the main insulating tape 40 of the insulating coil 22.

Thereafter, the stator unit 90 is taken out from the impregnation device 60 (S107), and the resin 47 impregnated in the insulating coil 22 including the main insulating tape 40 is solidified (S108). The method of solidifying the resin 47 is determined according to the properties of the epoxy resin to be used. For example, when a thermosetting epoxy resin is used, a method of housing the stator unit 90 in a drying furnace having a predetermined temperature for a predetermined time is performed, and the stator 20 is finally obtained (see FIG. 1). Thereafter, the stator 20 is attached to the frame 6 constituting the outer frame. Depending on the specifications of the rotary electric machine 1, the insulating coil 22 may be assembled in the stator core 21 previously attached to the frame 6. In this case, the assembly of the frame 6, the stator core 21, and the insulating coil 22 is treated as the stator unit 90.

<Method of Producing Resin>

Hereinafter, a method of producing the resin 47 impregnated into the main insulating tape 40 will be described. As described above, in order to improve the effect of suppressing the development of the electric tree T by the nanofiller 55 (insulating performance of the main insulating portion 35), it is necessary to form the impregnated portion 50 in which the nanofiller 55 is dispersed with high dispersiveness (uniformity) in the main insulating tape 40. In order to form such an impregnated portion 50, it is important to produce and use the resin 47 having high dispersiveness of the nanofiller 55.

The resin 47 according to the present embodiment is a composition produced by mixing an epoxy resin, a nanofiller, a reactive diluent, and an acid anhydride-based curing agent (curing agent).

The epoxy resin includes a compound which includes two or more three-membered rings composed of two carbon atoms and one oxygen atom in one molecule and can be cured. The epoxy resin includes, for example, a bisphenol A epoxy resin, an alicyclic epoxy resin, a bisphenol F type epoxy resin, a biphenyl type epoxy resin, a naphthalene type epoxy resin, a novolac type epoxy resin, a phenol novolac type epoxy resin, or the like as a main component. The epoxy resin may include these compounds singly or in combination of two or more kinds thereof. Specifically, the epoxy resin preferably includes an alicyclic epoxy resin from the viewpoint of chemical affinity with the reactive diluent.

The nanofiller includes a non-conductive metal oxide or the like. The nanofiller includes, for example, alumina, silica, titanium oxide, magnesium oxide, bismuth trioxide, cerium dioxide, cobalt monoxide, copper oxide, iron trioxide, holmium oxide, indium oxide, manganese oxide, tin oxide, yttrium oxide, zinc oxide, or the like as a main component. The nanofiller may include these compounds singly or in combination of two or more kinds thereof. The surface of the nanofiller may be modified with a coupling agent for the purpose of improving dispersiveness in the epoxy resin, preventing re-aggregation, improving adhesiveness, and the like.

The reactive diluent reduces the viscosity of the epoxy resin by reacting with the epoxy resin. The reactive diluent includes a compound that can be part of the skeleton in the cured product of the thermosetting resin composition by having a reactive group in the molecular skeleton. The reactive diluent includes, for example, butyl glycidyl ether, 1,4-butanediol diglycidyl ether, alkylene monoglycidyl ether, alkylphenol monoglycidyl ether, polypropylene glycol diglycidyl ether, alkylene diglycidyl ether, neopentyl glycol diglycidyl ether, 1,6-hexanediol diglycidyl ether, 1,12 dodecanediol diglycidyl ether, o-cresyl glycidyl ether, 1,2-epoxytetradecane, or the like as a main component. The reactive diluent may include these compounds singly or in combination of two or more thereof. Specifically, when the epoxy resin includes an alicyclic epoxy resin, the reactive diluent preferably includes butyl glycidyl ether.

The acid anhydride-based curing agent includes, for example, 4-methylhexahydrophthalic anhydride, hexahydrophthalic anhydride, tetrahydrophthalic anhydride, 4-methyltetrahydrophthalic anhydride, tetrabromophthalic anhydride, nadic anhydride, methyl nadic anhydride, trimellitic anhydride, pyromellitic anhydride, methylhymic anhydride, or the like as a main component. The acid anhydride-based curing agent may include these compounds singly or in combination of two or more kinds thereof.

A curing accelerator may be used to accelerate the reaction in the step of solidifying (curing) the resin 47 in a drying furnace or the like. The curing accelerator includes, for example, a compound capable of accelerating the crosslinking reaction between the epoxy compound and the acid anhydride-based curing agent. The curing accelerator includes, for example, a metal chelate compound, an ammonium ion compound, an imidazole compound, or the like as a main component. The curing accelerator may include these compounds singly or in combination of two or more kinds thereof.

The resin 47 includes, for example, an epoxy resin, a nanofiller, a reactive diluent, and an acid anhydride-based curing agent in the following proportions.

Epoxy resin: 30 wt % to 60 wt % (1)
Acid anhydride-based curing agent: 30 wt % to 60 wt % (2)
Reactive diluent: 5 wt % to 30 wt % (3)
Nanofiller: 2 wt % to 30 wt % with respect to the entire mixture of (1) to (3)

Figure 10:
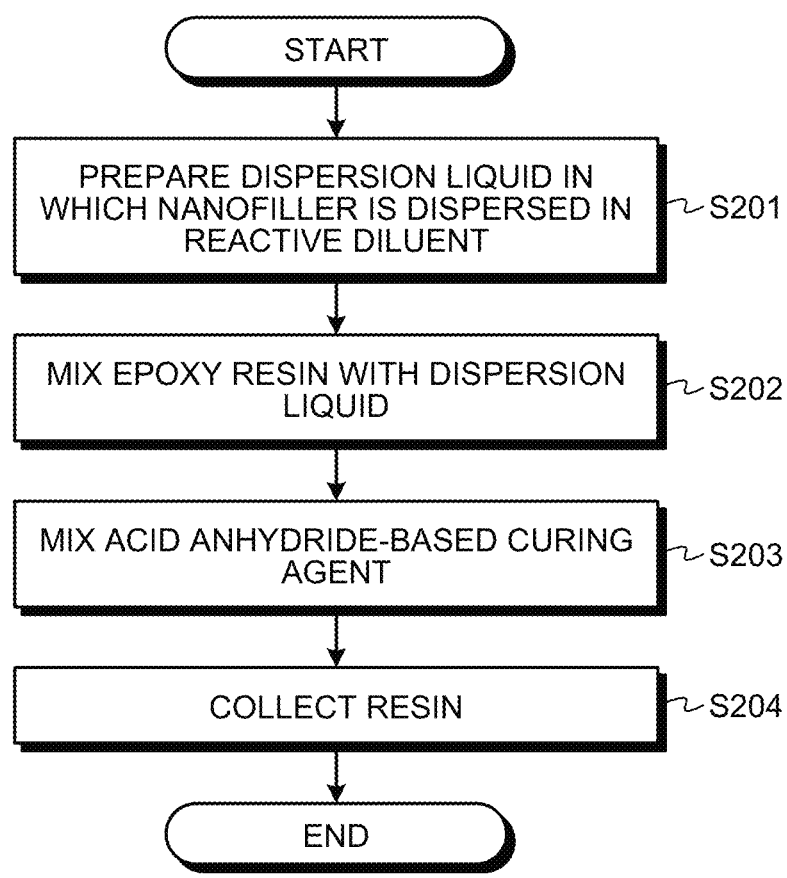
FIG. 10 is a flowchart illustrating a procedure in the method of producing a resin according to the embodiment.

FIG. 10 is a flowchart illustrating a procedure in the method of producing the resin 47 according to the embodiment.

First, a dispersion liquid in which the nanofiller is dispersed in a reactive diluent is prepared (S201). Thereafter, the epoxy resin and the dispersion liquid prepared in step S201 are mixed (dispersion liquid mixing step: S202). Thereafter, the composition produced in step S202 is mixed with an acid anhydride-based curing agent (curing agent mixing step: S203). Then, the composition produced in step S203 is collected as the resin 47 (S204).

As described above, the resin 47 produced as described above is used as the resin 47 with which the space in the main insulating tape 40 wound around the insulating coil 22 is impregnated.

In the above description, the step of using a curing accelerator is not illustrated, but a curing accelerator may be used as necessary.

<Evaluation of Dispersiveness of Nanofiller>

Hereinafter, the dispersiveness of the nanofiller 55 in the impregnated portion 50 when the main insulating tape 40 is impregnated with the resin 47 produced by the producing method according to the present embodiment is evaluated.

Figure 11:
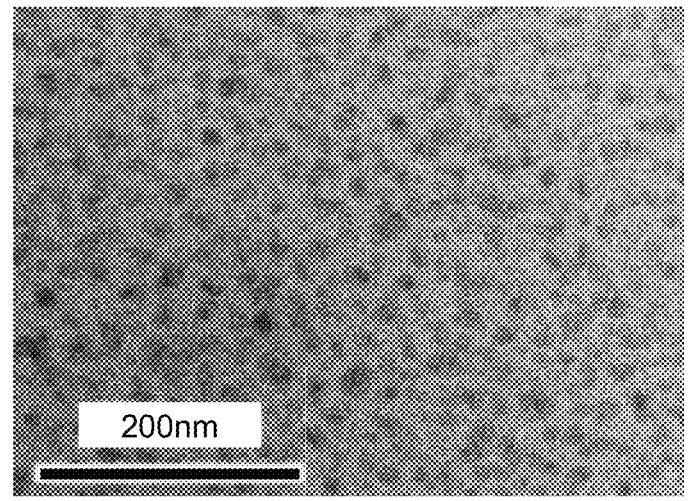
FIG. 11 is a diagram illustrating a result of observing a test piece extracted from an impregnated portion formed including the resin according to the embodiment with a transmission microscope.
Figure 12:
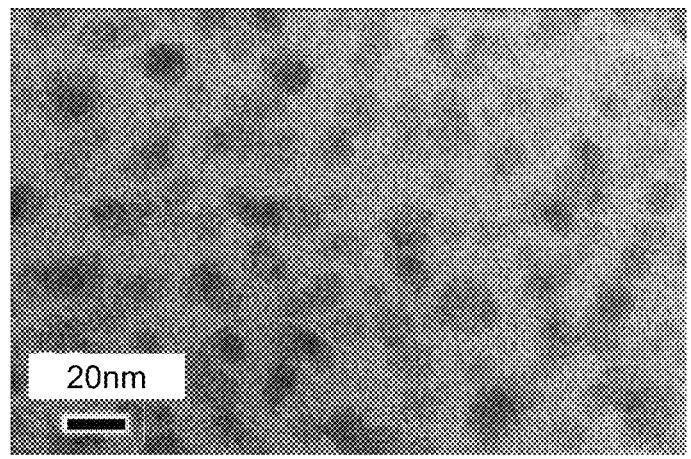
FIG. 12 is a diagram illustrating a result obtained by enlarging part of the result illustrated in FIG. 11 by 10 times.

FIG. 11 is a diagram illustrating a result of observing a test piece extracted from the impregnated portion 50 formed using the resin 47 according to the embodiment with a transmission microscope. FIG. 12 is a diagram illustrating a result obtained by enlarging part of the result illustrated in FIG. 11 by 10 times.

Here, a case where the nanofiller 55 including silica as a main component is included at a ratio of about 5 wt % with respect to the entire mixture of the above (1) to (3) is exemplified. FIGS. 11 and 12 illustrate a state in which the nanofiller 55 is hardly aggregated, and the nanofiller 55 having a particle diameter of about 15 nm is uniformly dispersed. Since the nanofiller 55 is dispersed with such high dispersiveness, the effect of suppressing the development of the electric tree T is realized at a high level as illustrated in FIG. 6.

Here, the case in which the resin 47 according to the present embodiment is included is compared with the case in which the resin according to the comparative example is included.

Figure 13:
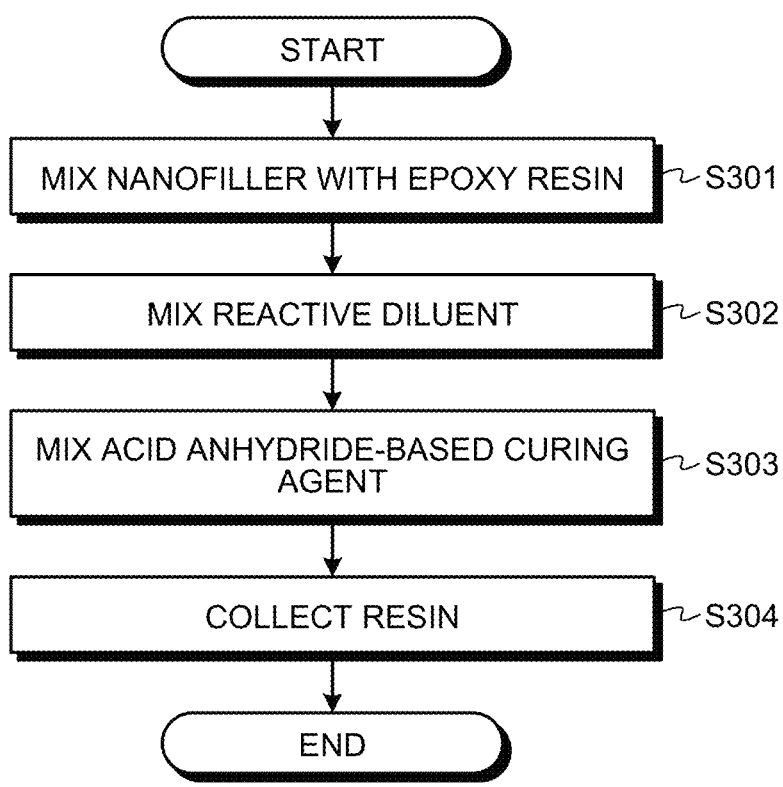
FIG. 13 is a flowchart illustrating a procedure in a method of producing a resin according to the comparative example.

FIG. 13 is a flowchart illustrating a procedure in the method of producing a resin according to the comparative example.

In the production method according to the comparative example, first, a nanofiller is mixed with an epoxy resin (S301). This mixing is usually performed using a planetary mixer (planetary stirrer), a three-roll mixer, a bead mill stirrer, or the like. Thereafter, the reactive diluent is mixed with the composition (mixture) produced in step S301 (S302). Thereafter, an acid anhydride-based curing agent is mixed with the composition produced in step S302 (S303). Then, the composition generated in step S303 is collected as a resin (S204).

The main insulating tape is impregnated with the resin produced by the production method according to the comparative example in the same manner as in the present embodiment to form an impregnated portion, and the dispersiveness of the nanofiller in the impregnated portion is evaluated.

Figure 14:
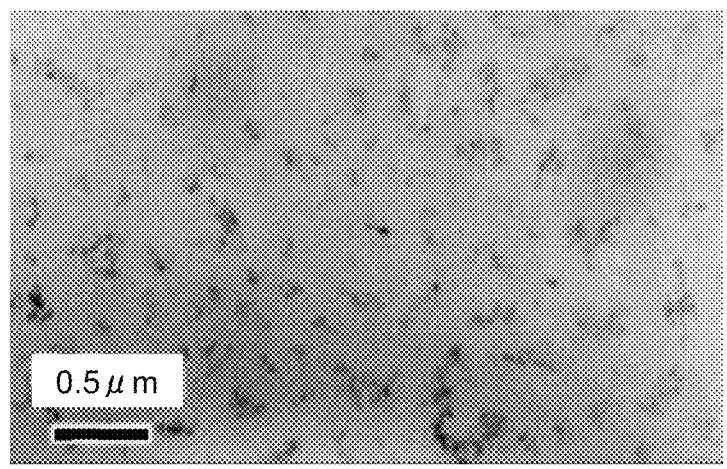
FIG. 14 is a diagram illustrating a result of observing a test piece extracted from an impregnated portion formed including a resin according to the comparative example with a transmission microscope.
Figure 15:
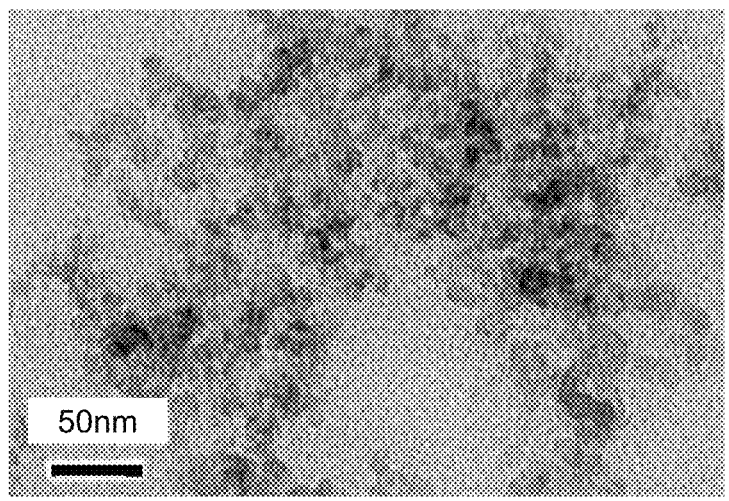
FIG. 15 is a diagram illustrating a result obtained by enlarging part of the result illustrated in FIG. 14 by 10 times.

FIG. 14 is a diagram illustrating a result of observing a test piece extracted from an impregnated portion formed including a resin according to the comparative example with a transmission microscope. FIG. 15 is a diagram illustrating a result obtained by enlarging part of the result illustrated in FIG. 14 by 10 times.

FIGS. 14 and 15 illustrate a state in which the nanofiller is aggregated and clustered. In addition, it can be seen that the short diameter or the long diameter of the cluster reaches several 10 nm to several 100 nm.

Figure 16:
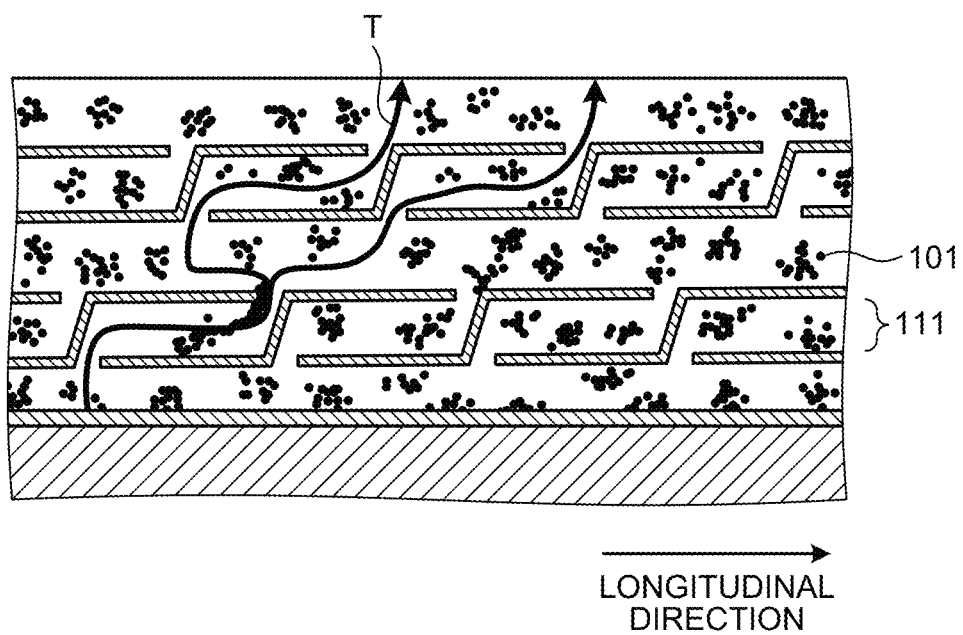
FIG. 16 is a cross-sectional view schematically illustrating the effect of a nanofiller according to the comparative example.

FIG. 16 is a cross-sectional view schematically illustrating an effect of a nanofiller 101 according to the comparative example.

As illustrated in FIG. 16, since the nanofiller 101 according to the comparative example is clustered, a non-existence region (region of only resin) where the nanofiller 101 does not exist is formed relatively widely in an impregnated portion 111. The electric tree T is likely to develop more linearly along such a non-existence region. Therefore, the effect of suppressing the development of the electric tree T by the nanofiller 101 is smaller than that in the case in which the resin 47 according to the present embodiment as illustrated in FIG. 6 is included.

<Evaluation on Viscosity Stability of Resin>

Hereinafter, stability of the viscosity of the resin 47 produced by the production method according to the present embodiment is evaluated.

The viscosity of the resin 47 including the nanofiller 55 increases over time. For example, in the case of the resin 47 including a thermosetting epoxy resin, the viscosity gradually increases with time even under an environment lower than the curing temperature, and when the viscosity exceeds a certain limit value, the resin can no longer be used. Hereinafter, a period until the resin 47 reaches the limit value after production is referred to as a pot life. It is economically desirable that the resin 47 prepared once can treat as many stator units 90 of the rotary electric machine 1 as possible. Therefore, the pot life is desirably as long as possible. That is, the rate of such unintended viscosity increase is desirably as slow as possible. The tendency of temporal change in the viscosity of the resin 47 varies depending on the dispersiveness of the nanofiller 55 included in the resin 47.

Figure 17:
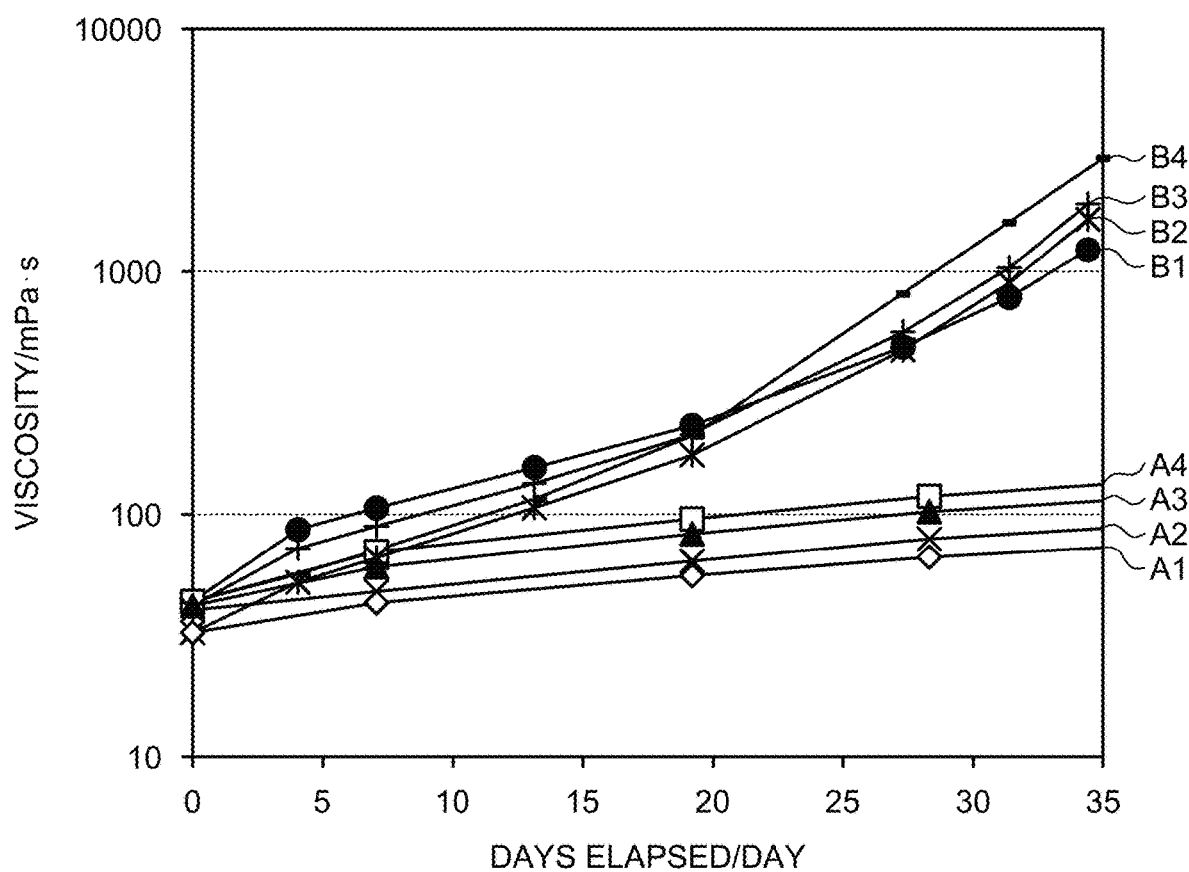
FIG. 17 is a graph in which a temporal change in viscosity of a resin according to the embodiment is compared with a temporal change in viscosity of a resin according to the comparative example.

FIG. 17 is a graph in which a temporal change in viscosity of the resin 47 according to the embodiment is compared with a temporal change in viscosity of the resin according to the comparative example.

In FIG. 17, four lines A1, A2, A3, and A4 located on the lower side indicate temporal changes in viscosity of the resin 47 according to the present embodiment. The resin 47 exemplified herein is produced by a production method illustrated in FIG. 10 including an alicyclic epoxy resin as an epoxy resin, acid anhydride tetrahydrophthalic anhydride as an acid anhydride-based curing agent, alkylene monoglycidyl ether as a reactive diluent, and titanium oxide as a nanofiller 55, and is mixed with the alicyclic epoxy resin:acid anhydride tetrahydrophthalic anhydride:alkylene monoglycidyl ether≈40:40:15.5 (wt %), and the mixture includes titanium oxide having a particle size of about 15 nm at a ratio of 5 wt %, 10 wt %, 15 wt %, or 20 wt %. The line A1 illustrates a case where the content of titanium oxide (nanofiller 55) is 5 wt %, the line A2 illustrates a case where the content of titanium oxide is 10 wt %, the line A3 illustrates a case where the content of titanium oxide is 15 wt %, and the line A4 illustrates a case where the content of titanium oxide is 20 wt %.

In FIG. 17, four lines B1, B2, B3, and B4 positioned above indicate temporal changes in viscosity of the resin according to the comparative example. The resin exemplified herein includes an alicyclic epoxy resin as an epoxy resin, acid anhydride tetrahydrophthalic anhydride as an acid anhydride-based curing agent, alkylene monoglycidyl ether as a reactive diluent, and titanium oxide as a nanofiller 55 and is produced by a production method illustrated in FIG. 13, and is mixed with the alicyclic epoxy resin:acid anhydride tetrahydrophthalic anhydride:alkylene monoglycidyl ether≈40:40:15.5 (wt %), and the mixture includes titanium oxide having a particle size of about 10 nm to several 100 nm at a ratio of 5 wt %, 10 wt %, 15 wt %, or 20 wt %. The line B1 illustrates a case where the content of titanium oxide (nanofiller) is 5 wt %, the line B2 illustrates a case where the content of titanium oxide is 10 wt %, the line B3 illustrates a case where the content of titanium oxide is 15 wt %, and the line B4 illustrates a case where the content of titanium oxide is 20 wt %.

As illustrated in FIG. 17, the viscosity of the resin 47 according to the present embodiment gradually increases with time as compared with the viscosity of the resin according to the comparative example. This is because the nanofiller is aggregated and clustered in the resin according to the comparative example, whereas the nanofiller 55 is uniformly dispersed in the resin 47 according to the present embodiment. As described above, according to the producing method of the present embodiment, since the low viscosity can be maintained for a long period of time, it is possible to provide the resin 47 having a long pot life (pot life).

<Evaluation of Insulation Life>

Hereinafter, the insulation life of the insulating structure produced using the resin 47 produced by the producing method according to the present embodiment is evaluated.

Figure 18:
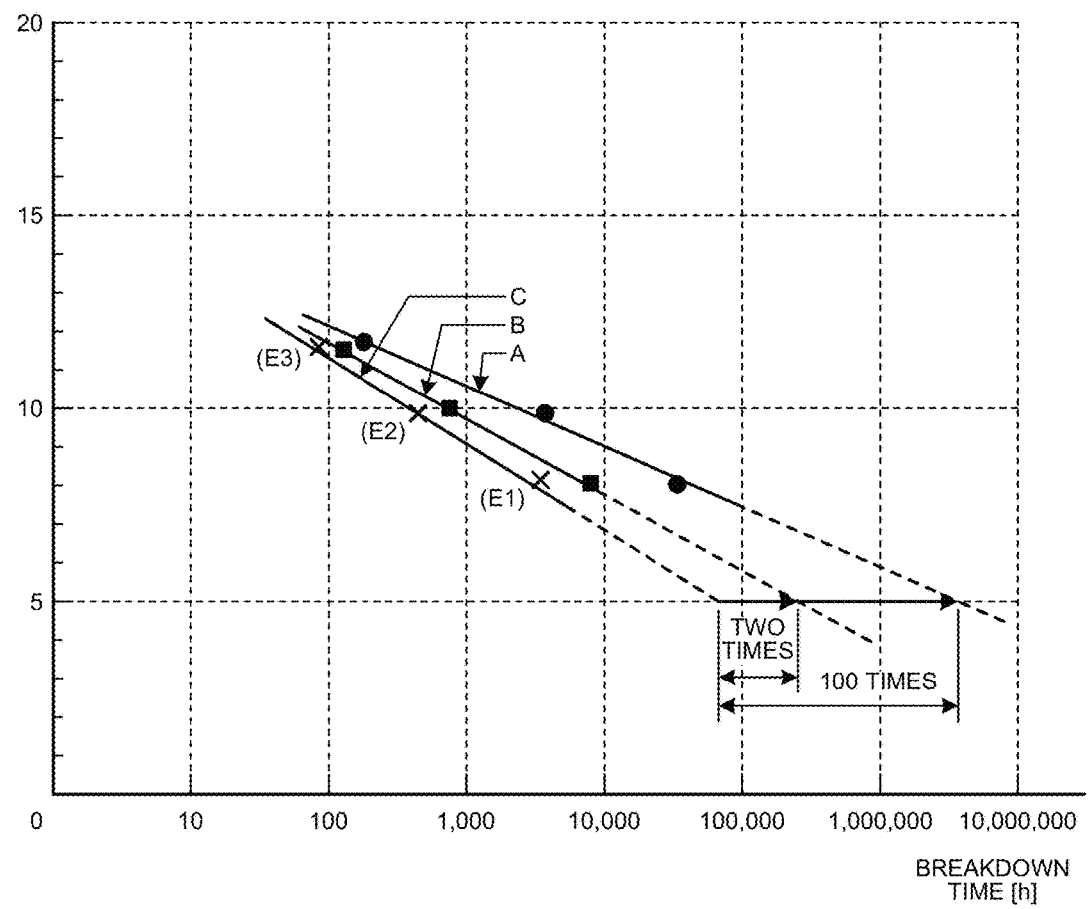
FIG. 18 is a graph in which an electric field versus time characteristic of an insulating structure produced including a resin according to the embodiment is compared with an electric field versus time characteristic of an insulating structure produced including a resin according to the first comparative example, and an electric field versus time characteristic of an insulating structure produced including a resin according to the second comparative example.

FIG. 18 is a graph in which the electric field versus time characteristics of the insulating structure produced including the resin 47 according to the embodiment is compared with the electric field versus time characteristics of the insulating structure produced including the resin according to the first comparative example, and the electric field versus time characteristics of the insulating structure produced including the resin according to the second comparative example.

In FIG. 18, a line A indicates the electric field versus time characteristics of the insulating structure produced using the resin 47 (the resin corresponding to the line A1 in FIG. 17) according to the present embodiment. A line B indicates the electric field versus time characteristics of the insulating structure produced using the resin (the resin produced by the production method illustrated in FIG. 13: the resin corresponding to the line B1 in FIG. 17) according to the first comparative example. A line C indicates the electric field versus time characteristics of the insulating structure produced using the resin (resin including no nanofiller) according to the second comparative example.

When evaluating the long-term voltage-life characteristics of the insulating structure of the rotary electric machine 1, the life at three points of the electric field (E1, E2, E3) higher than E is first experimentally determined with respect to the electric field: E (interphase voltage/insulation thickness) of the rotary electric machine 1 actually used, and the three points are linearly approximated. This approximate straight line is referred to as an electric field versus time characteristic, and the life in the electric field desired to be used can be predicted to estimate the operation life by extrapolating the electric field-time approximate straight line to the lower electric field side closer to the electric field when the rotary electric machine 1 is actually operated.

The results of the present implementation based on the above method are illustrated in FIG. 18. Each point is an average value (63% of Weibull distribution) of five coils obtained under the same condition. As an example, considering 5 kV/ram as a lower electric field, the operation life in the case in which the resin according to the first comparative example (B in the figure) is included is about 2 times the operation life in the case in which the resin according to the second comparative example (C in the figure) is included, but the operation life in the case in which the resin 47 according to the present embodiment (A in the figure) is included is about 100 times the operation life in the case in which the resin according to the second comparative example (C in the figure) is included. This is because, according to the present embodiment, as described above, the dispersiveness of the nanofiller 55 is high, and the effect of suppressing the development of the electric tree T is larger than that of the first comparative example.

<Case Where Reactive Diluent is Not Included>

As described above, the method of producing a resin according to the present embodiment includes the use of a reactive diluent as one of the features. Here, the third comparative example in which a resin including a nanofiller is produced using a diluent other than the reactive diluent will be described.

In the third comparative example, a dispersion liquid in which the nanofiller is dispersed in a diluent such as acetone, methyl ethyl ketone, or alcohol is mixed with an epoxy resin or the like (an epoxy resin, a curing agent, or mixture of both). Next, the mixture of the dispersion liquid and the epoxy resin or the like is heated or vacuum defoamed, or heated and vacuum defoamed to remove the diluent from the entire mixture. In such a method according to the third comparative example, it is possible to produce the resin including the nanofiller.

However, in the third comparative example, there is a high possibility that in the process of mixing the dispersion liquid (diluent such as acetone in which the nanofiller is dispersed) with an epoxy resin or the like to produce a liquid resin, an unexpected chemical reaction occurs, resulting in an increase in viscosity, deterioration in insulating performance, and the like. In addition, in the third comparative example, since a process for removing the diluent (heating, vacuum defoaming, or combination of both) is required, there are problems such as complication of the process and an increase in cost.

On the other hand, according to the present embodiment, the problem as in the third comparative example does not occur, and the high-quality resin 47 can be relatively easily produced at low cost.

As described above, according to the present embodiment, it is possible to produce the resin 47 having high dispersiveness and high viscosity stability of the nanofiller 55. This makes it possible to efficiently produce a high-performance insulating structure. In addition, it is possible to eliminate the need to use an expensive device such as a planetary mixer, a three-roll mixer, or a bead mill stirrer for dispersing the nanofiller 55.

The above-described embodiment of the present invention does not limit the scope of the invention, and is merely an example included in the scope of the invention. In an embodiment of the present invention, for example, at least part of the specific application, structure, shape, operation, and effect may be changed, omitted, or added to the above-described embodiment without departing from the gist of the invention.

EXPLANATIONS OF LETTERS OR NUMERALS

1 ROTARY ELECTRIC MACHINE
5 BEARING
6 FRAME
7 BEARING BRACKET
10 ROTOR
11 ROTOR SHAFT
12 ROTOR CORE
20 STATOR
21 STATOR CORE
22 INSULATING COIL
31 LAMINATED CONDUCTOR (CONDUCTOR)
31A CONDUCTING WIRE
33 TURN INSULATING PORTION
35 MAIN INSULATING PORTION
40 MAIN INSULATING TAPE (TAPE-SHAPED MEMBER)
41 MAIN INSULATING LAYER
42 FIBER REINFORCED LAYER
43 POLYMER LAYER
47 RESIN
50 IMPREGNATED PORTION
55 NANOFILLER
60 IMPREGNATION DEVICE
61 CONTAINER
62 EXHAUST PIPE
62A EXHAUST VALVE
63 SUPPLY PIPE
63A SUPPLY VALVE
64 TREATMENT TANK
65 PRESSURIZED GAS
90 STATOR UNIT
T ELECTRIC TREE

The invention claimed is:

1. A method of producing a resin with which an insulating structure formed on an outer peripheral portion of a conductor is impregnated, the method comprising:
    a dispersion liquid mixing step of mixing an epoxy resin with a dispersion liquid in which a nanofiller is dispersed in a reactive diluent that reduces a viscosity of the epoxy resin by reacting with the epoxy resin; and
    a curing agent mixing step of mixing a composition produced by the dispersion liquid mixing step, with a curing agent that cures the epoxy resin.

2. The method of producing a resin according to claim 1, wherein
    the epoxy resin includes an alicyclic epoxy resin.

3. The method of producing a resin according to claim 2, wherein
    the reactive diluent includes butyl glycidyl ether.

4. The method of producing a resin according to claim 1, wherein
    a particle diameter of the nanofiller in the dispersion liquid is 50 nm or less.

5. The method of producing a resin according to claim 1, wherein
    a content of the nanofiller with respect to an entire mixture other than the nanofiller included in the resin is 2 wt % to 30 wt %.

6. The method of producing a resin according to claim 2, wherein
    a particle diameter of the nanofiller in the dispersion liquid is 50 nm or less.

7. The method of producing a resin according to claim 3, wherein
    a particle diameter of the nanofiller in the dispersion liquid is 50 nm or less.

8. The method of producing a resin according to claim 2, wherein
    a content of the nanofiller with respect to an entire mixture other than the nanofiller included in the resin is 2 wt % to 30 wt %.

9. The method of producing a resin according to claim 3, wherein
a content of the nanofiller with respect to an entire mixture other than the nanofiller included in the resin is 2 wt % to 30 wt %.

10. The method of producing a resin according to claim 4, wherein
a content of the nanofiller with respect to an entire mixture other than the nanofiller included in the resin is 2 wt % to 30 wt %.

11. The method of producing a resin according to claim 6, wherein
a content of the nanofiller with respect to an entire mixture other than the nanofiller included in the resin is 2 wt % to 30 wt %.

12. The method of producing a resin according to claim 7, wherein
a content of the nanofiller with respect to an entire mixture other than the nanofiller included in the resin is 2 wt % to 30 wt %.

13. A method of producing an insulating structure formed on an outer peripheral portion of a conductor, the method comprising:
a resin production step of producing a resin including a nanofiller; and
a step of impregnating a non-conductive tape-shaped member wound around an outer peripheral portion of the conductor, with the resin, wherein
the resin production step includes
a dispersion liquid mixing step of mixing an epoxy resin with a dispersion liquid in which the nanofiller is dispersed in a reactive diluent that reduces a viscosity of the epoxy resin by reacting with the epoxy resin, and
a curing agent mixing step of mixing a composition produced by the dispersion liquid mixing step, with a curing agent that cures the epoxy resin.

14. The method of claim 13, wherein
the epoxy resin includes an alicyclic epoxy resin.

15. The method of claim 14, wherein
the reactive diluent includes butyl glycidyl ether.

16. The method of claim 13, wherein
a particle diameter of the nanofiller in the dispersion liquid is 50 nm or less.

17. The method of claim 13, wherein
a content of the nanofiller with respect to an entire mixture other than the nanofiller included in the resin is 2 wt % to 30 wt %.

* * * * *